United States Patent
Rogers et al.

(10) Patent No.: US 6,656,238 B1
(45) Date of Patent: *Dec. 2, 2003

(54) COAL-BASED CARBON FOAM

(75) Inventors: Darren Kenneth Rogers, Wheeling, WV (US); Janusz Wladyslaw Plucinski, Glen Dale, WV (US)

(73) Assignee: Touchstone Research Lab., Triadelphia, WV (US)

( * ) Notice: Subject to any disclaimer, the term of this patent is extended or adjusted under 35 U.S.C. 154(b) by 130 days.

This patent is subject to a terminal disclaimer.

(21) Appl. No.: 09/954,490

(22) Filed: Sep. 17, 2001

Related U.S. Application Data

(63) Continuation-in-part of application No. 09/453,729, filed on Dec. 2, 1999.

(51) Int. Cl.[7] .................................................. C10L 5/00
(52) U.S. Cl. ........................... 44/620; 44/607; 44/628; 264/29.1; 423/448; 423/460; 428/408
(58) Field of Search .................... 44/620, 607, 628; 201/35; 423/448, 460; 428/408; 264/29.1

(56) References Cited

U.S. PATENT DOCUMENTS

| | | |
|---|---|---|
| 3,018,227 A | 7/1962 | Baum et al. |
| 3,111,396 A | 11/1963 | Ball |
| 3,185,635 A | 5/1965 | Creglow |
| 3,309,437 A | 3/1967 | Harnett |
| 3,754,876 A | 8/1973 | Pennington et al. |
| 4,127,391 A | 11/1978 | Koppelman |
| 4,128,401 A | 12/1978 | Powell et al. |
| 4,432,773 A | 2/1984 | Euker, Jr. et al. |
| 4,475,924 A | 10/1984 | Meyer |
| 4,632,731 A | 12/1986 | Bodle et al. |
| 4,668,244 A | 5/1987 | Nakamura et al. |
| 4,849,021 A | 7/1989 | Nakai et al. |
| 5,705,139 A | 1/1998 | Stiller et al. |
| 5,888,469 A | 3/1999 | Stiller et al. |
| 6,033,506 A * | 3/2000 | Klett ........................ 156/78 |

FOREIGN PATENT DOCUMENTS

| | | |
|---|---|---|
| GB | 1 489 690 | 10/1977 |

* cited by examiner

*Primary Examiner*—Margaret Medley
(74) *Attorney, Agent, or Firm*—McGuire Woods LLP

(57) ABSTRACT

A method for the manufacture of coal-based carbon foams from a coal particulate starting material that comprises blending from 1 to about 10% by weight of pitch with the coal particulate before foaming. Blends of coal-based particulate with 1 to about 10% by weight of pitch as well as coal-based carbon foams manufactured from such blends are also described.

11 Claims, 2 Drawing Sheets

COAL-BASED CARBON FOAM

This application is a continuation-in-part of U.S. patent application Ser. No. 09/453,729 filed Dec. 2, 1999 and entitled, "Coal-Based Carbon Foam" and copending herewith.

FIELD OF THE INVENTION

The present invention relates to carbon foam materials derived from coal and more particularly to such foams that exhibit lower densities but equal strengths than similar prior art such materials.

BACKGROUND OF THE INVENTION

U.S. patent applications Ser. No. 09/453,729 filed Dec. 12, 1999 and Ser. No. 09/902,828 filed on Jul. 10, 2001 both describe porous coal-based materials having a density of between about 0.1 g/cm$^3$ and about 0.6 g/cm$^3$ that are produced by the controlled heating of small coal particulate in a "mold" and under a non-oxidizing atmosphere. The coal starting material preferably exhibits a free swell index of between about 3.5 and about 5.0 and most preferably between about 3.75 and about 4.5. The porous product thereby produced can be machined, adhered and otherwise fabricated to produce a wide variety of low cost, low density products, or used in its preformed shape as a filter, heat or electrical insulator etc. Such porous products, without further treatment exhibit compressive strengths of up to about 6000 psi. Further treatment by carbonization or graphitization yields products that can be used as electrical or heat conductors. Methods for the production of these coal based cellular products are also described in these applications.

While the coal based foam products produced in accordance with the methods described in these applications provide significant strength relative to their densities and are relatively easy to produce and fabricate, foams of even lower density, but of comparable strength that are somewhat more flexible in their manufacturing processes would be highly desirable. For example, the ability to produce very complicated shapes without first having to produce an oversized monolith and then "machining" the shape therefrom would be highly desirable.

The availability of a plastic, "pre-blended" composition ready for processing into foam of a lower density than previously available from coal would also be advantageous.

OBJECT OF THE INVENTION

It is therefore an object of the present invention to provide a method for the production of coal-based carbon foams of lower density than but equal strength as those previously available in the prior art.

Is another object of the present invention to provide a method for the manufacture of coal-based carbon foams that lends itself to the production of such materials from highly plastic precursor blends that simplify the formation and production of coal-based foam products, especially those possessing highly complex shapes.

SUMMARY OF THE INVENTION

According to the present invention, there is provided a method for the manufacture of coal-based carbon foams from a coal particulate starting material that comprises blending from 1 to about 10% by weight of pitch with the coal particulate before foaming. Blends of coal-based particulate with 1 to about 10% by weight of pitch as well as coal-based carbon foams manufactured from such blends are also described.

DETAILED DESCRIPTION

Figure 1:
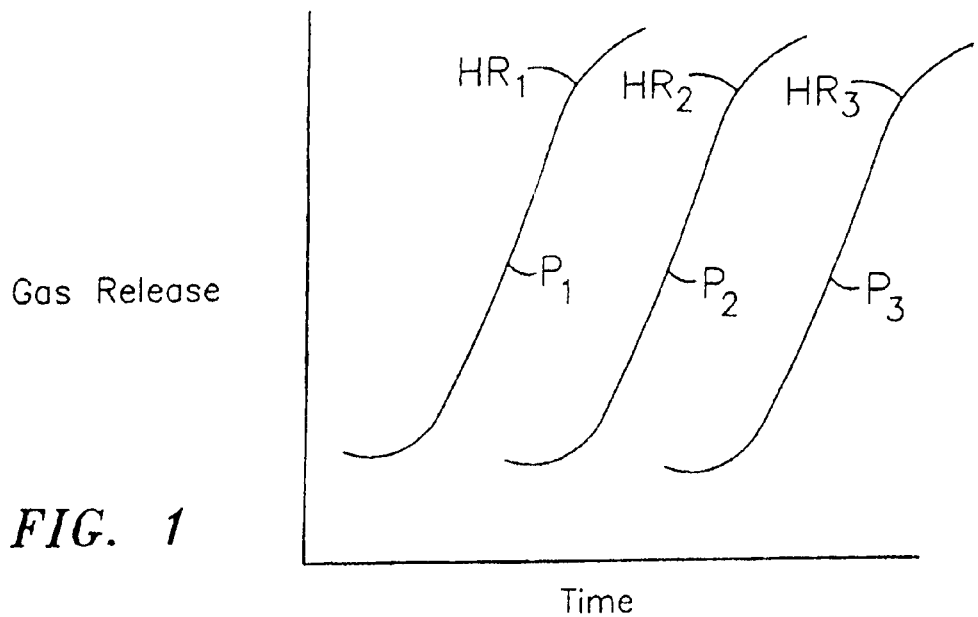
FIG. 1 is a graph of showing the general relationship between gas evolution and time/temperature at various operating pressures and temperatures for the process of the present invention.

According to the present invention, a preformed, low density, i.e., from about 0.01 to about 0.5 g/cm$^3$, and preferably from about 0.05 to about 0.1 g/cm$^3$, cellular product is produced from a blend of: 1) powdered coal particulate preferably less than about ¼ inch in diameter; and 2) from about 1 to about 10% by weight based on the weight of the coal particulate of pitch, by the controlled heating of the coal/pitch blend in a "mold" under a non-oxidizing atmosphere. The starting material coal may include bitumen, anthracite, or even lignite, or blends of these coals that exhibit a "free swell index" as determined by ASTM D720 of between about 3.5 and about 5.0, but are preferably bituminous, agglomerating coals that have been comminuted to an appropriate particle size, preferably to a fine powder below about –60 to –80 mesh. The pitch may be petroleum-derived pitch or coal-derived pitch although coal derived pitch is generally considered more difficult to process and generally has less material uniformity and lower performance, i.e properties than those derived from petroleum. Most of the petroleum companies produce pitch, a carbon precursor, as a by-product of the refining process. Mitsubishi Chemical Co. is one of the major producers of high performance mesophase pitch. Commercial sources of coal-derived pitch include Athabasca (or Alberta) pitch, Pittsburgh pitch, etc. The chemistry and processing of carbon containing materials to extract pitch or to synthesize pitch are well known and have been discussed in numerous textbooks and publications.

The cellular coal/pitch-based blend foams described herein are semi-crystalline or more accurately turbostratically-ordered and largely isotropic i.e., demonstrating physical properties that are approximately equal in all directions. The cellular coal/pitch-based blend foams of the present invention typically exhibit pore sizes on the order of less than 500µ, although pore sizes of up to 1000µ are possible within the operating parameters of the process described. The thermal conductivities of the cellular coal/pitch-based blend foams are generally less than about 1.0 W/m/° K. Typically, the cellular coal/pitch-based blend products of the present invention demonstrate compressive strengths on the order of from about 2000 to about 6000 psi at densities of from about 0.05 to about 0.5 g/cm$^3$ It is critical to the successful practice of the present invention that the coal starting material exhibit the previously specified free swell index of between about 3.5 and about 5.0 and preferably between about 3.75 and about 4.5. Selection of starting materials within these parameters was determined by evaluating a large number of coals characterized as ranging from high to low volatiles. In general, it has been found that bituminous coals exhibiting free swell indexes within the previously specified ranges provided the best foam products in the form of the lowest calcined foam densities and the highest calcined foam specific strengths (compressive strength/density). Coals having free swell indices below these preferred ranges may not agglomerate properly leaving a powder mass or sinter, but not swell or foam, while coals exhibiting free swell indices above these preferred ranges may heave upon foaming and collapsed upon themselves leaving a dens compact.

The production method of the present invention comprises: 1) heating a blend of: A) coal particulate of preferably small i.e., less than about ¼ inch particle size blended with; B) from about 1 to about 10% by weight, based upon the weight of the coal particulate, of a pitch to a temperature at or just above the softening point of the pitch, generally, but no necessarily a temperature of from about 240° C. to below about 280° C., to form a plastic blend; 2) heating the plastic blend thus formed in a "mold" and under a non-oxidizing atmosphere at a heat up rate of from about 1 to about 20° C. to a temperature of between about 300 and about 700° C.; 3) soaking at a temperature of between about 300 and 700° C. for from about 10 minutes up to about 12 hours to form a foam preform or finished product; and 4) controllably cooling the preform or finished product to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

During the first heating step, the pitch softens and flows about the coal-based particulate and begins to sinter to form an "interparticulate bond". The presence of the pitch about the coal-based particulate allows for greater expansion as volatiles are emitted therefrom during the subsequent heating and soaking steps thereby resulting in the formation of a lower density, i.e. larger cell size, coal-based foam than was previously obtainable when the process was performed in the absence of the pitch. Thus, it is important that the first heating step be performed at a temperature that allows the pitch to soften and flow about the coal-based particulate prior to the onset of sintering as is achieved by the higher temperature heating of heating step 2.

Although it is generally not desirable that the reaction chamber be vented or leak during the second heating and soaking operations in prior art processes since the pressure of the chamber and the increasing volatile content therein tends to retard further volatilization while the cellular product sinters at the indicated elevated temperatures, such control is significantly less important in the present process, as the presence of the softened pitch about coal-based particulate prior to the onset of sintering assures the presence of adequate material to permit inter-particulate sintering even in the relative absence of any volatiles in the atmosphere to contribute to inter-particulate sintering. Thus, according to a preferred embodiment of the present process, venting or leakage of non-oxidizing gas and generated volatiles is permitted or inhibited consistent with the production of an acceptable cellular product.

Additional more conventional blowing agents may be added to the particulate prior to expansion to enhance or otherwise modify the pore-forming operation, if desired. The application of such materials including their blending with the starting materials is well known in the art and is not elaborated upon further herein.

The term "mold", as used herein is meant to define a mechanism for providing controlled dimensional forming of the expanding coal. Thus, any chamber into which the coal particulate is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the instant invention. In this case, even an extruder that forms the plastic mass into a shape by extrusion through an appropriately shaped die is to be considered a "mold" for purposes of this invention. The ability to form a plastic precursor by heating the coal-based particulate/pitch blend to a temperature adequate to cause softening and flow of the pitch about the coal-based particulate is particularly important in the formation of complex foam shapes, since the plastic precursor can be placed in the "mold", to specifically include an extruder, where it is easily subsequently processed into a complex shape.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the produced porous coal will increase as the size of the "bubbles" or pores produced in the expanded coal decreases. Conversely, the release of the gas pressure within the reaction vessel during heating step 2 will result in the formation of lower density foams, such an advantage being specifically attributable in this case to the presence of the pitch. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc. These results are graphically represented in the FIG. 1 where the X axis is gas release, the Y axis is time and the individual curves represent different pressures of inert gas $P_1$, $P_2$, and $P_3$, different heat-up rates $HR_1$, $HR_2$, and $HR_3$, and $P_1<P_2<P_3$ and $HR_1<HR_2<HR_3$.

Cooling of the coal-based particulate/pitch foam preform or product after soaking is not particularly critical except as it may result in cracking of the foam preform or product as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the coal particulate/pitch blend as just described, the porous coal-based foam product is an open celled material. Several techniques have been developed for "sealing" the surface of the open celled structure to improve its adhesive capabilities for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the expanded coal/pitch blend product or preform rapidly, e.g., at a rate of 10° C./min or faster after expansion. It has been discovered that this process modification results in the formation of a more dense skin on the preform or product which presents a closed pore surface to the outside of the preform or product. At these cooling rates, care must be exercised to avoid cracking of the preform or product.

After expanding, the porous coal/pitch blend-based preform or product is readily machineable, sawable and otherwise readily fabricated using conventional fabrication techniques as previously described in connection with earlier prior art coal-based foams that did not incorporate pitch as described herein.

Subsequent to production of the preform or product as just described, the preform or product may be subjected to carbonization and/or graphitization according to conventional processes to obtain particular properties desirable for specific applications of the type described hereinafter. Ozonation may also be performed, if activation of the coal-based expanded product would be useful in a final product application such as in filtering of air. Additionally, a variety of additives and structural reinforcers may be added to the coal-based preforms or products either before or after expansion to enhance specific mechanical properties such as fracture strain, fracture toughness and impact resistance. For example, particles, whiskers, fibers, plates, etc. of appropriate carbonaceous or ceramic composition can be incorporated into the porous coal-based preform or product to enhance its mechanical properties.

The open celled, coal-based preforms or products of the present invention can additionally be impregnated with, for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape preforms or final products of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication.

Carbonization, sometimes referred to as calcining, is conventionally performed by heating the preform or product under an appropriate inert gas at a heat-up rate of less than about 5° C. per minute to a temperature of between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove all of the non-carbon elements present in the preform or product such as sulfur, oxygen, hydrogen, etc.

Graphitization, commonly involves heating the preform or product either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

The porous coal/pitch blend-based foams resulting from processing in accordance with the foregoing procedures can be used in a broad variety of product applications, some, but not all, of which will now be broadly described.

Perhaps the simplest products that could be fabricated using the coal-based porous preforms or products of the present invention are various lightweight sheet products useful in the construction industry. Such products may involve the lamination of various facing materials to the surface of a planar sheet of the preform material using an appropriate adhesive. For example, a very light and relatively inexpensive wall board would simply have paper laminated to its opposing planar surfaces, while a more sophisticated curtain wall product might have aluminum sheet, polymer or fiber-reinforced polymer sheets or even stainless steel sheet laminated thereto. A wide variety of such products that have lightweight, low cost and adequate strength can easily be envisioned for wallboard, structural wallboard, bulkheads, etc. The materials of the present invention exhibit sound insulation and vibration resistance due to excellent sound and vibration damping properties, and good thermal insulating properties (less than about 1 watt per meter K thermal conductivity).

Laminates of these materials may even be used to produce heating element incorporating members, since a graphitized core could serve as an electrical heating element when connected to an appropriate source of electrical energy.

Similar surface laminated porous preform core based products could also find use in the transportation industry where lighter and, especially fire retardant walls, bulkheads, containers, etc. are in constant demand. Such products would of course require that the expanded coal/pitch blend-based porous core be carbonized as described hereinabove prior to application of the exterior skins, if fire resistance or retardancy is desired.

Yet another product application for the porous coal products of the present invention is as a replacement for the ceramic foam filters currently applied in the filtering of molten metal such as aluminum for the removal of contaminating particulates also called inclusions. The current ceramic foam materials are relatively expensive and extremely friable. It is easily possible to produce a porous coal-based preform of the type described herein having an appropriate pore size and of the same size and shape as the ceramic foam filter using the above described fabrication process, to serve as a molten metal filter of this type. The cost of such a more robust, i.e., less friable, filter would be considerably less than that of a comparable ceramic foam filter.

Yet other product applications for the materials of the present invention reside in the field of heat exchangers. In this application, the heat transfer properties of a graphitized porous coal/pitch blend-based material can be exploited to produce a heat exchanger capable of extracting heat from or adding heat to a fluid (gas or liquid) flowing through porous coal pores. In this case, the coal-based porous product is joined to an appropriate heat transfer mechanism such as an aluminum skin.

As already alluded to, the coal/pitch blend-based foams of the present invention can be produced in any solid geometric shape. Such production is possible using any number of modified conventional processing techniques such as extrusion, injection molding, etc. In each of such instances, the process must, of course, be modified to accommodate the processing characteristics of the starting material coal/pitch blend. For example, in extruding such products, as described below, the plastic coal powder/pitch blend starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the input materials, coal particulate and pitch can be formed into a plastic blend by heating to a temperature above the softening point of the pitch but below the expansion point, e.g., below about 300° C., fed into the auger chamber where additional heat is imparted to the blend with final heating being achieved just before extrusion through the die.

Similar relatively minor process modifications can be envisioned to fabricate the carbon foams of the present invention in injection molding, casting and other similar conventional material fabrication processes.

The following examples will serve to illustrate the practice of the invention.

EXAMPLES

Example 1

Figure 2:
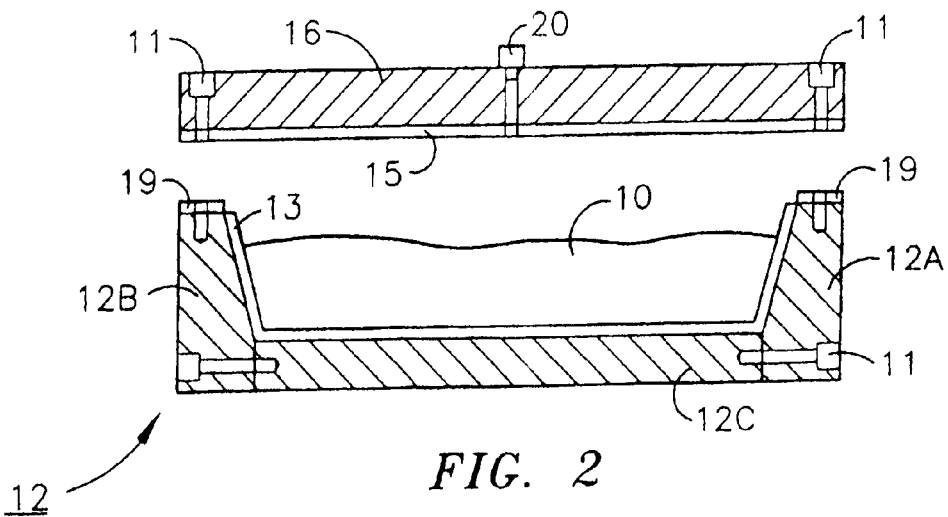
FIG. 2 is a cross-sectional view of a "mold" containing powdered coal prior to expansion in accordance with the process of the present invention.
Figure 3:
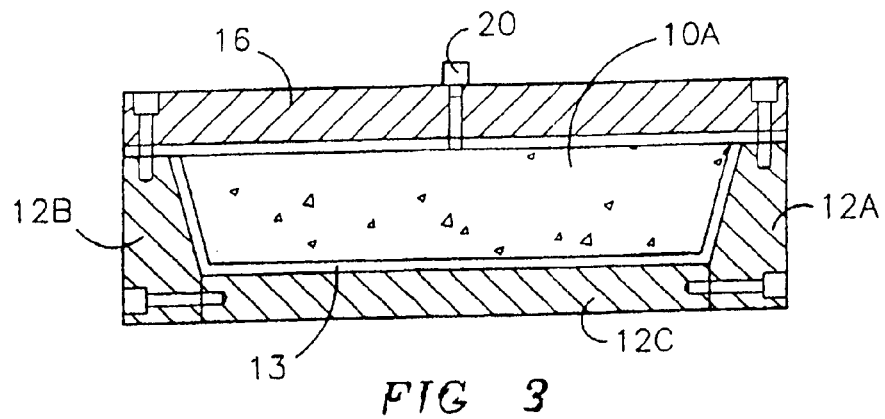
FIG. 3 is a cross-sectional view of the "mold" of FIG. 2 subsequent to expansion of the powdered coal in accordance with the process of the present invention.

As shown in FIG. 2, a n about 2 inch deep layer 10 of comminuted bituminous coal having a free swell index of about 4 and ground to a particle size of about -60 mesh blended with 5% by weight of a petroleum pitch is deposited in mold 12 equipped with a cover 16. Mold 12 is assembled from three individual pieces carbon or tool steel pieces, sides 12A and 12B and bottom 12C, all joined together by bolts 11 and lined with a ceramic glaze or spray applied ceramic lining 13. Cover 16 includes a similar interior ceramic lining 15 and is attached to sides 12A and 12B with bolts 17 in the final assembly prior to heating. Gaskets 19 are preferably used to insure a tight fit of cover 16 onto sides 12A and 12B. Cover 16 is optionally equipped with a sintered vent plug 20 to permit purging of the interior of mold 12 with non-oxidizing gas. This configuration, incorporating valve 20 also permits pressurization, if desired to control expansion speed and/or pore size in the final product as described hereinabove. Nitrogen gas is repeatedly introduced through valve 20 to assure that all oxygen in mold 12 is purged (generally 2–4 such purges have been found satisfactory) and to provide a one atmosphere pressure of nitrogen inside of mold 12. Mold 12 is then heated at a rate of from about 1 to about 10° C./min up to a temperature of about 250° C. and hel for 15 to 30 minutes and then further heated at the same rate to a temperature of about 450 and 600° C. and held at this temperature sufficient to devolatalize and sinter the cellular product (generally less than about one hour). This treatment results in the production of an open celled expanded coal product 10A as shown in FIG. 3. Mold 12 is then cooled to room temperature at a rate of less than about 10° C./min. to a temperature of 100° C.; any remaining pressure is then vented through valve 15 and the sample removed from mold 12 by disassembly of mold 12 by disengagement of bolts 11. Expanded coal product 10A is thereby readily removed from mold 14 and is subsequently sawed or otherwise shaped by machining to the desired dimensions.

Product 10A has a density of between about 0.1 and about 0.3 g/cm$^3$ and demonstrates a compressive strength on the order of between about 2000 and 6000 psi. Thermal conductivity as determined by the guarded heat flow method is below about 1.0 W/m/K.

Example 2

Figure 4:
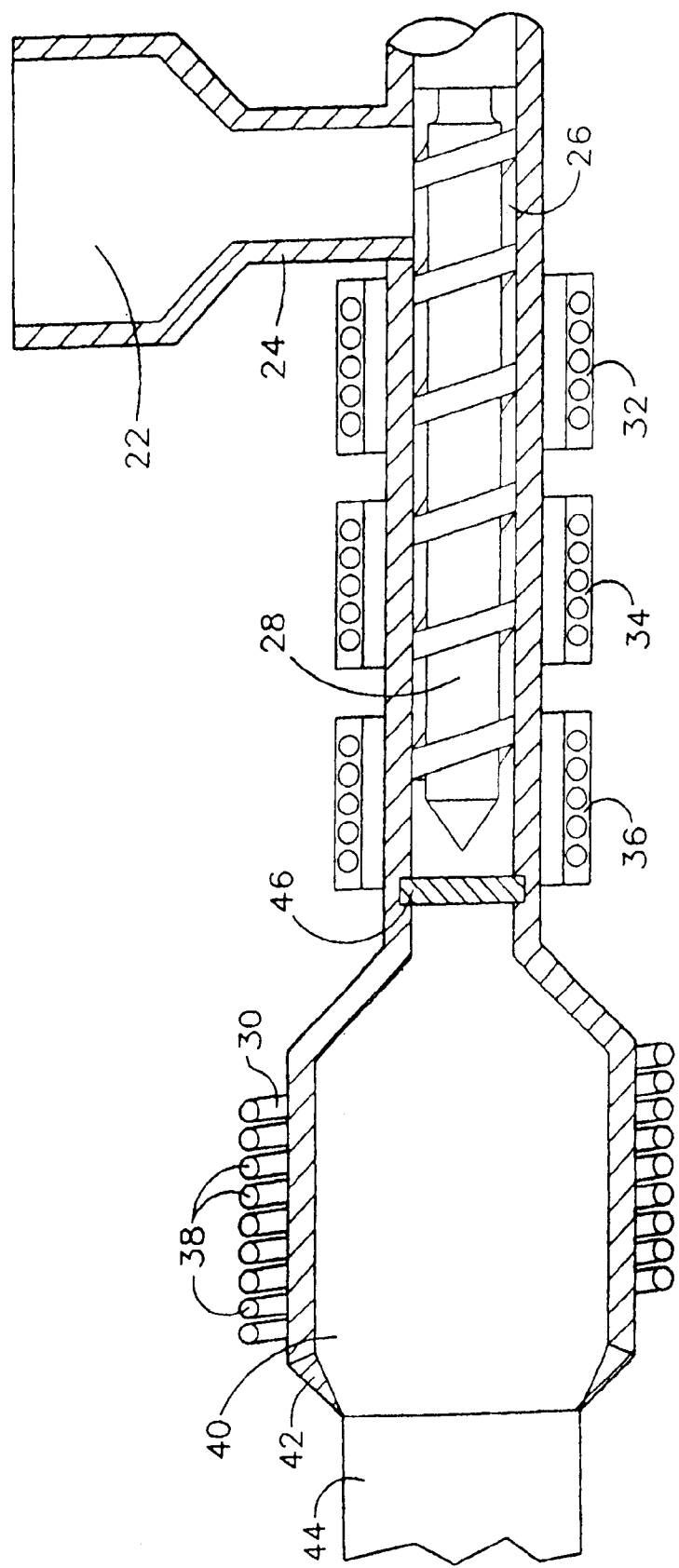
FIG. 4 is a cross-sectional diagram of an extruder suitable for the production of coal-based porous products in accordance with the present invention.

The application of the process of the present invention in an extrusion process is depicted in FIG. 4. As shown in that figure, comminuted bituminous coal 22 of a particle size of about -80 mesh previously blended with about 5 to 7% by weight of a coal extracted pitch is introduced via hopper 24 into chamber 26 equipped with auger 28 that moves the particulate coal/pitch blend 18 through chamber 26 and into expansion chamber 30. Chamber 26 is heated by means of a series of barrel heaters 32, 34 and 36 to impart a temperature of less than about 300° C. to particulate coal/pitch blend 18 as it approaches and enters expansion chamber 26. As is conventional practice in extrusion, chamber 26 is divided into a feed section, a compression section and a metering section each defined roughly by the location of barrel heaters 32, 34 and 36 and imparted by the tapered shape of auger 28. Expansion chamber 30 is maintained under a non-oxidizing atmosphere and at a temperature of about 450° C. by means of barrel heater 38. Particulate coal/pitch blend 18 expands within chamber 26 to form expanded coal product 40 and, while still viscous, expanded coal product 40 is extruded through a die 42 to form solid shaped product 44 upon cooling to room temperature. Solid shaped product 44 demonstrates properties similar to those obtained from the product described in Example 1.

At the point where particulate coal/pitch blend 22 exits chamber 26 and enters expansion chamber 30, chamber 26 is preferably equipped with a breaker plate 46 that serves to break up any large agglomerates of particulate coal/pitch blend 22 that may have formed in transit within chamber 26.

Cellular coal-based extrudate 44 may have virtually any solid shape ranging from a large flat panel 4'×8' as might be used as the core of the above-described building panel to square shapes, rounds, channels and even tubular shapes if a bridge die is used in the extrusion process. Almost any shape that can be achieved with plastic or metal extrusion can be similarly obtained using the process of the present invention.

As the invention has been described, it will be apparent to those skilled in the art that the same may be varied in many ways without departing from the spirit and scope of the invention. Any and all such modifications are intended to be included within the scope of the appended claims.

What is claimed is:

1. A semi-crystalline, largely isotropic, porous coal-based product having a density of between about 0.05 and about 0.1 g/cm$_3$ and a thermal conductivity below about 1 W/m/° K produced from a blend comprising:

A) from about 90 to about 99% by weight of particulate coal exhibiting a free swell index of between about 3.5 and about 5.0 and of a small diameter; and B) from about 1 to about 10% by weight of pitch.

2. The porous coal-based product of claim 1 wherein said coal exhibits a free swell index of between about 3.75 and about 4.5.

3. The porous coal-based product of claim 2 having a compressive strength below about 6000 psi.

4. The porous coal-based product of claim 2 that has been carbonized.

5. The porous coal-based product of claim 2 that has been graphitized.

6. A method for producing a porous coal-based product from coal exhibiting a free swell index of between about 3.5 and about 5.0 comprising:

A) comminuting said coal to a small particle size to form a ground coal;

B) blending said ground coal with from about 1 to about 10% by weight based upon the weight of the ground coal of a pitch;

C) heating the product of step B to a temperature at or above the softening temperature of the pitch but below the sintering temperature of the ground coal to form a plastic coal/pitch mass;

D) placing said coal/pitch mass in a mold;

E) heating said coal/pitch mass in said mold under a non-oxidizing atmosphere to a temperature of between about 300° C. and about 700° C. and soaking at this temperature for a period of from about 10 minutes to about 12 hours to form a preform; and F) controllably cooling said preform.

7. The method of claim 6 wherein said coal exhibits a free swell index of between about 3.75 and about 4.5.

8. The method of claim 7 wherein said inert atmosphere is applied at a pressure of from about 0 psi up to about 500 psi.

9. The method of claim 7 wherein the temperature in step E is achieved using a heat-up rate of between about 1° C. to about 20° C. per minute.

10. The method of claim 7 wherein said controlled cooling is accomplished at a rate of less than about 10° C./min to a temperature of about 100° C.

11. A plastic coal particulate/pitch blend comprising from about 90 to about 99% by weight of particulate coal exhibiting a free swell index of between about 3.5 and about 5.0 and of a small diameter; and from about 1 to about 10% by weight of pitch.

* * * * *

UNITED STATES PATENT AND TRADEMARK OFFICE
CERTIFICATE OF CORRECTION

| | |
|---|---|
| PATENT NO. | : 6,656,238 B1 |
| DATED | : December 2, 2003 |
| INVENTOR(S) | : Darren Kenneth Rogers et al. |

It is certified that error appears in the above-identified patent and that said Letters Patent is hereby corrected as shown below:

<u>Column 1,</u>
Line 3, insert the following: -- This invention was made with Government support under Contract Number F33615-00-C-5007 awarded by the Air Force Research Laboratory. The Government has certain rights in the invention. --.

Signed and Sealed this

Sixth Day of July, 2004

JON W. DUDAS
*Acting Director of the United States Patent and Trademark Office*